United States Patent [19]

Catterall

[11] 3,997,735
[45] Dec. 14, 1976

[54] TELEPHONE STATION MAKE-BUSY CIRCUIT

[75] Inventor: John Mason Catterall, Columbus, Ohio

[73] Assignee: Bell Telephone Laboratories, Incorporated, Murray Hill, N.J.

[22] Filed: Sept. 24, 1975

[21] Appl. No.: 616,284

[52] U.S. Cl. .............................................. 179/84 C
[51] Int. Cl.[2] ........................................ H04M 3/42
[58] Field of Search ........... 179/18 AB, 84 R, 84 C

[56] References Cited
UNITED STATES PATENTS

| | | | |
|---|---|---|---|
| 3,673,339 | 6/1972 | Korn | 179/18 AB X |
| 3,777,067 | 12/1971 | Kilby | 179/84 R X |

Primary Examiner—William C. Cooper
Attorney, Agent, or Firm—Dwight A. Marshall

[57] ABSTRACT

A telephone central office trunk utilized for establishing connections of calling telephone station lines with a called telephone station line is arranged to enable a subscriber to make a called telephone station appear busy to incoming calls. The trunk is provided with apparatus arranged to respond to the momentary appearance of a low impedance across the called telephone station line in response to ringing signals applied thereto by opening the established connections and applying busy tone to the calling telephone station lines.

10 Claims, 1 Drawing Figure

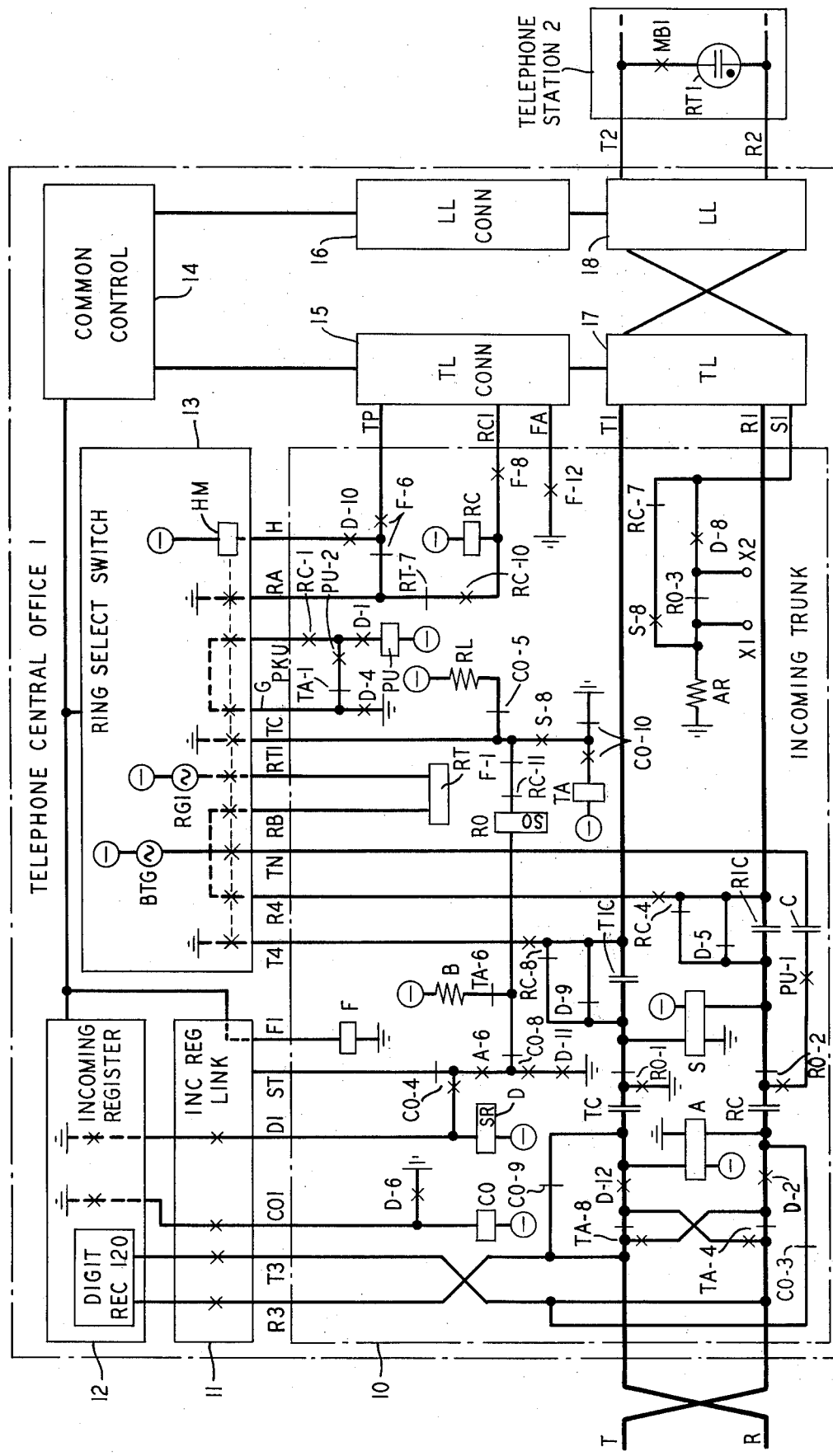

TELEPHONE STATION MAKE-BUSY CIRCUIT

BACKGROUND OF THE INVENTION

1. Field of the Invention

This invention relates to telephone systems. In particular, it relates to an arrangement for enabling a telephone station served by a telephone system to appear busy to incoming calls.

2. Description of the Prior Art

There has been an increasing need in recent years for an arrangement to enable a subscriber to make a telephone station appear busy to incoming calls. For example, a subscriber may wish to make a telephone station appear busy to incoming calls when the subscriber is not at home. Another subscriber having more than one telephone station to serve a business location may elect to make one or more unmanned telephone stations busy to incoming calls during non-rush hours in order that incoming calls may be alternately routed to other manned telephone stations.

In the past, a subscriber made a telephone station busy to incoming calls by removing the telephone station receiver from the switch hook. A problem arises in this method of making a telephone station busy in that the telephone office serving the telephone station recognizes the receiver off-hook signal as a call request and attempts to serve the off-hook telephone station. After a short time interval the telephone office identifies the receiver off-hook signal as a permanent receiver off-hook signal and establishes a connection in response thereto from the telephone station line to a special termination holding line oftentimes referred to as a permanent signal trunk. When a large number of telephone stations are made busy in this manner, the telephone office attempts to establish connections to all off-hook telephone stations. However, the large number of call requests from the off-hook telephone stations, in combination with requests from calling telephone stations, results in a congestion of the telephone office switching equipment and thereby restricts the capacity of the telephone office to complete call connections.

Attempts have been made in the past to solve this problem by equipping each telephone station line with a special line lockout circuit arranged to hold the telephone station line out of service for the duration of the telephone station receiver off-hook condition. Such line lockout circuits relieve the congestion of the telephone office but have disadvantages in that the telephone office must have a line lockout circuit for each telephone station line and each telephone station line so equipped is then held out of service for the duration of the receiver off-hook condition.

Accordingly, a need exists in the art for an arrangement for enabling a subscriber to busy a telephone station to incoming calls without holding the telephone station line out of service. A need also exists for apparatus arranged for selectively establishing connections of calling telephone stations to called telephone stations to respond to a subscriber made-busy one of the called telephone stations by returning busy signals to each calling telephone station.

SUMMARY OF THE INVENTION

In the exemplary embodiment of the invention, apparatus for selectively establishing connections of calling telephone station lines with a called telephone station line is arranged for enabling a subscriber to busy the called telephone station line to incoming calls generated by the calling telephone station lines. Telephone office trunk apparatus utilized to selectively establish connections of calling telephone station lines with called telephone station lines comprises apparatus arranged for busying a called telephone station line having the make-busy feature by interrupting the established connections and coupling busy tone signals to the calling telephone station lines.

A telephone station provided with the make-busy feature is equipped with apparatus actuated by ringing signals applied to the called telephone station line to condition the called telephone station line to momentarily assume an off-hook or busy state during occurrence of the ringing signals. The telephone office trunk apparatus responds to the momentarily appearance of the busy state on the called telephone station line by opening the transmission connection established between the calling and called telephone station lines and connecting a generator with the transmission connection to apply busy tone signals to the calling telephone station.

In accordance with one feature of the invention, a telephone station make-busy arrangement for use with apparatus arranged to selectively establish connections of calling telephone station lines with a called telephone station line comprises apparatus for conditioning the called telephone station line to momentarily assume an off-hook state during occurrence of ringing signals. Other apparatus is enabled by the conditioning apparatus for busying the called telephone station line by interrupting the established connections and applying busy tone signals to the calling telephone station lines.

In accordance with another feature of the invention, a telephone station make-busy arrangement for making an on-hook called telephone station line appear busy to incoming calls also comprises apparatus having terminals normally separated by a high impedance path that is selectively connectable by a subscriber across the called telephone station line. Ringing signals aplied to the on-hook called telephone station line and appearing at the terminals enable the apparatus to conduct and convert the high impedance path into a low impedance path to condition the called on-hook telephone station line to momentarily assume an off-hook state. The momentarily appearance of the off-hook state across the called telephone station line enables telephone office trunk apparatus to return busy tone announcement to calling telephone station lines.

In accordance with still another feature of the invention, a telephone office trunk arranged for selectively establishing transmission connections of calling telephone station lines with called telephone station lines comprises generator apparatus for generating ringing and busy announcement signals. Relay apparatus for establishing the transmission connections connects the generator apparatus to the called telephone station line to apply ringing signals thereto and is released by the momentarily appearance of a low impedance path across the called telephone station line to connect answer signal relay apparatus to the called telephone station line. A subsequent appearance of a high impedance path across the called telephone station line inhibits operation of the answer signal relay apparatus to prevent return of the answer signal to calling telephone station lines. Additional apparatus enabled by the trunk relay apparatus opens the transmission connections to the called telephone station line and connects the generator apparatus to the calling telephone station line to return busy announcement signals thereto.

DESCRIPTION OF THE DRAWING

The foregoing objectives and advantages, as well as others of the invention, will be more apparent from a description of the drawing wherein is set forth the schematic details of the telephone station make-busy arrangement embodying the principles of the instant invention.

It will be noted that the drawing employs a type of notation referred to as "Detached Contact" in which an X, shown intersecting a conductor, represents a normally opened "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September 1955 publication of the *American Institute of Electrical Engineers Transactions, Communications and Electronics*, volume 74, pages 505–513.

GENERAL DESCRIPTION

Referring now to the drawing, it is intended that telephone central office 1 shown thereof be of the type disclosed by A. J. Busch in U.S. Pat. No. 2,585,904. The present invention is not limited to use with a telephone switching system of this type but may be advantageously utilized with other types of switching systems as well. It is further intended that telephone central office 1 be equipped with incoming trunk 10 arranged to extend an incoming call appearing on trunk conductors T, R through trunk link 17 and line link 18 over telephone station line T2, R2 to called telephone station 2. A subscriber located at telephone station 2 and desiring to make telephone station 2 appear busy to incoming calls operates a switch associated with telephone station 2 to close make contacts MB1 and thereby connect a nominally high impedance path, herein represented as neon tube RT1, across telephone station line T2, R2.

The incoming call seqence is initiated by seizure of incoming trunk 10 associated with telephone central office 1 serving called telephone station 2. After seizure, incoming trunk 10 selects incoming register 12 in the well-known manner, via incoming register link 11, and establishes a connection thereto from trunk conductors T, R. Telephone directory number signals identifying called telephone station 2 and dialed from a calling telephone station coupled with trunk conductors T, R are received over trunk conductors T, R and recorded in digit receiver 120. After receipt of the dialed telephone directory number signals, incoming register 12 seizes common control 14 and transfers the dialed telephone directory number thereto. Common control 14 in the well-known manner controls line link and trunk link connectors 16, 15 to establish a connection from trunk conductors T1, R1 through trunk and line links 17, 18 of the switch network to telephone station line T2, R2. In addition to establishing the aforementioned connection, common control 14 sets ring select switch 13 to apply a prescribed combination of ringing signals, via incoming trunk 10, over trunk conductors T1, R1 and telephone station line T2, R2 to called telephone station 2.

Ringing signals appearing on telephone station line T2, R2 ionize neon tube RT1 to conduct and momentarily place a low impedance path across conductors T2, R2. The low impedance path momentarily appearing across telephone station line T2, R2 enables, or as sometimes referred to in telephony as trips, incoming trunk 10 of telephone central office 1 to remove the ringing signals from conductors T2, R2. Incoming trunk 10 further responds to the momentarily appearance of the low impedance path across telephone station line T2, R2 by extending conductors T2, R2 thereof, via conductors T1, R1, to trunk supervision relay S.

Normally the effect of a subscriber answering called telephone station 2 would maintain the low impedance, or off-hook, path across telephone station line T2, R2 to operate supervisory relay S and thereby enable incoming trunk 10 to return an answer indication to the calling telephone station. In the present embodiment of the invention, the removal of ringing signals from telephone station line T2, R2 extinguishes neon tube RT1 thereby replacing the low impedance path with a high impedance path, sometimes referred to as a telephone station on-hook. The appearance of the high impedance path across called telephone station line T2, R2 subsequent to the removal of the ringing signals prevents operation of supervision relay S and enables incoming trunk 10 apparatus, hereinafter described in detail, to open the connection established with called telephone station 2 and to couple busy tone signals over trunk conductors T, R back to calling telephone stations.

In summary, the trunk apparatus of a telephone office serving telephone stations is arranged for enabling a subscriber located at a telephone station to make a telephone station appear busy to incoming calls. The subscriber makes a telephone station busy by operating a key to place a normally high impedance path across the on-hook telephone station line. A telephone office trunk establishing a call connection to the called on-hook telephone station is activated by the momentary appearance of a low impedance path across the telephone station line in response to ringing signals to initiate a sequence to open the established connection and apply busy tone signals to calling telephone stations.

DETAILED DESCRIPTION

1. Telephone Station Make-Busy

Referring again to the drawing, a subscriber located at telephone station 2 and desiring to make telephone station 2 appear busy to incoming calls operates a switch to close make contacts MB1. The closing of make contacts MB1 connects neon tube RT1 across telephone station line T2, R2 utilized for coupling telephone station 2 with telephone central office 1. Neon tube RT1 may be any one of a type of gas tubes well-known in the art that are operated when the voltages applied across the terminals thereof are in the range of the ringing voltages utilized to ring called telephone stations. Although a neon tube is disclosed it is also recognized that other apparatus such as solid state or semi-conductor devices having terminals normally separated by a high impedance and activated by voltages applied to the terminals to convert the high impedance path into a low impedance path may also be employed in the manner of neon tube RT1.

In the presence of the normal voltages appearing on telephone station line T2, R2 coupled to idle or on-hook telephone station 2, neon tube RT1 remains in the non-conducting state thereby maintaining a high impedance path across conductors T2, R2. Even though telephone station 2 has been made busy to incoming calls the normal high impedance path of neon tube RT1 enables telephone station 2 to maintain an on-hook appearance toward line link 18 and thereby prevent the seizure and holding of telephone central office 1 equipment.

2. Incoming Telephone Call

The start of an incoming call intended for telephone station 2 occurs upon the seizure of incoming trunk 10 in the well-known manner by placing a low impedance path across trunk conductors T, R. Current flows through the windings of relay A from ground and battery through normal break contacts CO-3, CO-9 over incoming trunk conductors T, R and through the low impedance path to operate relay A. Operation of relay A closes make contacts A-6 to extend battery through resistor B, normal break contacts TA-6, and the break portion of transfer contacts CO-8 over start lead ST to incoming register link 11. Incoming register link 11 in the well-known manner functions to connect an idle incoming register 12 to incoming trunk 10. Incoming register 12 applies ground to lead CO1 through closed make contacts of incoming register link 11 to operate relay CO. Relay CO in operating opens break contacts CO-3, CO-9 to transfer supervision of the incoming call from relay A to incoming register 12 over leads T3, R3.

Telephone directory number digits identifying called telephone station 2 are received over trunk conductors T, R and are extended over leads T3, R3 to digit receiver 120 of incoming register 12. Following receipt of the telephone directory number digits incoming register 12 places ground on lead D1 to operate relay D. Relay D in operating closes make contacts D-2, D-12 to reconnect relay A through the break portion of transfer contacts TA-4, TA-8 with incoming trunk conductors, T, R. In addition, relay D closes make contacts D-6 to provide a hold path for relay CO and make contacts D-11 to provide a self-hold path through the make portion of transfer contacts CO-4, CO-8 and make contacts A-6 to ground.

Incoming register 12, having received the number of digits identifying called telephone station 2, establishes a connection to common control 14 and transfers the number information thereto. Common control 14 in the well-known manner identifies the location of incoming trunk 10 within telephone central office 1 and operates relay F over lead F1 via incoming register link 11.

Operation of relay F closes make contacts F-12, F-8 and the make portion of transfer contacts F-6 to extend lead FA, RC1, and TP to trunk link connector 15. Common control 14 applies ground to lead TP to connect the circuitry of ring select switch 13 with incoming trunk 10.

3. Establishing a Telephone Call Connection

Common control 14 also applies ground by trunk link connector 15 to lead RC1 to operate ring control relay RC. Relay RC in operating closes make contacts RC-10 to establish a hold path from ground applied to lead RA by ring select switch 13 through normal break contacts RT-7 to the winding of relay RC. Operation of relay RC also opens break contacts RC-11 in the operate path of relay RO and closes the make portion of transfer contacts RC-8, RC-4 to connect trunk conductors T1, R1 with leads T4, R4 extending to ring select switch 13. The closing of make contacts RC-1 establishes a path from ground through operated make contacts D-4 over a path set up through ring select switch 13 between leads G, PKU and operated make contacts D-1 to operate relay PU.

Common control 14 also controls trunk link connector 15 and line link connector 16 to establish a transmission path from incoming trunk conductors T1, R1 through the switch network of trunk and line links 17, 18 to called telephone station conductors T2, R2. The ringing connection is then established from battery in ring select switch 13 to ringing generator RG1 over lead RT1 through the winding of relay RT over lead RB and from ground through paths of ring select switch 13 to leads R4, T4, the make portion of operated transfer contacts RC-4, RC-8, over trunk conductors R1, T1 through trunk and line links 17, 18 to called telephone station line R2, T2.

4. Incoming Call Busy

The alternating ringing voltages from ring generator RG1 appearing on called telephone station line T2, R2 ionize neon tube RT1 thereby resulting in a low impedance path momentarily appearing across conductors T2, R2 through operated make contacts MB1. The resultant flow of current from ground and battery from ring switch 13 through the make portion of operated transfer contacts RC-8, RC-4 over trunk conductors T1, R1 and called telephone station line T2, R2 and through the low impedance of make contacts MB1 and conducting neon tube RT1 operates ring trip relay RT to open break contacts RT-7. Opening of break contacts RT-7 interrupts the hold path for ring control relay RC and allows it to release. Release of relay RC releases transfer contacts RC-8, RC-4 to disconnect ring supply leads T4, R4 from trunk conductors T1, R1 which are then connected through the break portion of the released transfer contacts RC-8, RC-4 to supervision relay S. A transmission connection then extends from trunk conductors T, R through the break portion of transfer contacts TA-4, TA-8, the closed make contacts D-2, D-12, capacitors RC, TC, the break portions of transfer contacts RO-2, RO-1, RC-4, RC-8 and trunk conductors R1, T1 and telephone station line R2, T2 to called telephone station 2.

The removal of ringing voltage from trunk conductors T1, R1 by operation of relay RC extinguishes neon tube RT1 and thereby removes the low impedance path from across called telephone station line T2, R2. The high impedance path subsequently appearing across called telephone station line T2, R2 inhibits operation of supervision relay S. An operate path was established for relay RO upon release of relay RC from ground appearing on lead TC through released break contacts F-1, RC-11, the winding of relay RO, and released break contacts TA-6 to resistance battery. Slow operate relay RO operates to open the make portion of transfer contacts RO-1, RO-2 and thereby interrupt the aforementioned transmission connection established to called telephone station 2. Transfer contacts RO-1, RO-2, in addition to interrupting or opening the transmission connection to called telephone station 2, connects ground to trunk conductor R and busy tone signal from busy tone generator BTG of ring select switch 13 through capacitor C and operated make contacts PU-1 to trunk conductor T. The busy tone signals are then applied from the make portion of transfer contacts RO-1, RO-2 through capacitors TC, RC, make contacts D-12, D-2 and the break portion of transfer contacts TA-8, TA-4 over trunk conductors R, T to the calling telephone station line. Operation of relay RO, in addition to enabling incoming trunk 10 to return busy tone signals to calling telephone stations, opens break contacts RO-3 to prevent calling telephone station lines from holding made-busy telephone station 2 out of service. Opening of break contacts RO-3 removes ground from sleeve lead S1 to enable telephone central office 1 to release the connection from incoming trunk 10 to called telephone station 2 previously established through trunk and line links 17, 18.

When calling telephone stations having received busy tone signals are returned to the idle or on-hook state, the A relay of incoming trunk 10 releases and initiates the disconnect sequence by opening make contacts A-6 to release relay D. Relay D in releasing restores incoming trunk 10 to the idle state by opening make contacts D-6, D-4 to interrupt the hold paths for relays CO, PU and make contacts D-10 to initiate the disconnect of ring select switch 13.

SUMMARY

It is obvious from the foregoing that the facility, economy, and efficiency of telephone systems may be substantially enhanced by the provision of telephone central office trunk apparatus arranged to make a called telephone station appear busy to incoming calls. It is further obvious that the present arrangement for utilizing a telephone central office trunk to provide the called telephone station make-busy feature alleviates the need to employ additional line lock-out apparatus for each telephone station to provide a make-busy feature.

While the equipment of the invention has been disclosed in a telephone central office wherein a called telephone station may be made busy to incoming calls, it is to be understood that such an embodiment is intended to be illustrative of the principles of the invention and that numerous other inventions may be devised by those skilled in the art without departing from the scope and spirit of the invention.

For example, the present telephone station make-busy apparatus disclosed for use with a telephone central office incoming trunk can also be used with telephone central office intraoffice trunks utilized for establishing call connections between telephone stations served by the same telephone central office. It is furthermore possible to use the instant telephone station make-busy apparatus to establish no charge hold connections to telephone station lines waiting to be answered. In this arrangement, the RO-3 make contacts are deleted by connecting X1 with X2 and the busy tone generator BTG replaced by an appropriate busy announcement signal generator. Thus, on an incoming call the operation of trunk relay RO causes busy announcement signals to be transmitted to a calling telephone station and the connection to the called telephone station is held without charge until answer. Upon answer, supervision relay S operates to enable relay TA, via make contacts S-8, to operate transfer contacts TA-8, TA-4 to return answer signal to the calling telephone station line by reversing trunk conductors T, R toward the calling telephone station line.

What is claimed is:

1. A telephone station make-busy arrangement for use with apparatus arranged for selectively establishing a connection of a calling telephone station line with a called telephone station line in an on-hook state comprising means actuated by ringing signals applied to the called telephone station line for conditioning the called telephone station line to momentarily assume an off-hook state during occurrence of the ringing signals, and means responsive to the off-hook state momentarily appearing on the called telephone station line for causing said apparatus to interrupt the established connection and apply a busy indication to the calling telephone station line.

2. The telephone station make-busy arrangement set forth in claim 1 wherein said conditioning means comprises means having terminals normally separated by a high impedance path and arranged for converting the high impedance path into a low impedance path during appearance of the ringing signals at the terminals, and means for selectively connecting said path converting means across the called telephone station line.

3. The telephone station make-busy arrangement set forth in claim 2 wherein said causing means comprises means for generating busy tone signals, and means enabled by the momentary appearance of the low impedance path across the on-hook called telephone station line for releasing the calling telephone station line from the established connection and connecting said generating means to the calling telephone station line.

4. A telephone station make-busy arrangement for making a called telephone station line appear busy to calling telephone station lines comprising trunk means for establishing a connection of one of the calling telephone station lines with the called telephone station line and applying ringing signals thereto, means for conditioning the called telephone station line to momentarily assume an off-hook state during the application of the ringing signals, and means responsive to the off-hook state momentarily appearing on the called telephone station line for causing said trunk means to interrupt the established connection and to couple busy signals to the calling telephone station line.

5. The telephone station make-busy arrangement set forth in claim 4 wherein said trunk means further comprises a first generator for generating the ringing signals, first relay means having break contacts and operable by a low impedance path appearing across the called telephone station line for returning an answer signal to the calling telephone station line, second relay means having break contacts and make contacts, ones of the break contacts for connecting said first relay means to the called telephone station line and the make contacts for connecting said first generator to the called telephone station line, and third relay means having break contacts and make contacts and enabled during establishment of the connection for closing the make contacts to establish an operate path for said second relay means.

6. The telephone station make-busy arrangement set forth in claim 5 wherein said conditioning means comprises conducting means having first and second terminals normally separated by a high impedance path and arranged to convert the high impedance path into a low impedance path during appearance of the ringing signals across the first and second terminals, and switch means for enabling a subscriber to selectively connect the first and second terminals of said conducting means across the called telephone station line.

7. The telephone station make-busy arrangement set forth in claim 6 wherein said causing means comprises a second generator for generating busy announcement signals, and means comprising a series combination of the break contacts of said first, second, and third relay means and enables by release of said first, second, and third relay means for opening the established connection with the called telephone station line and connecting said second generator to said calling telephone station line.

8. The telephone station make-busy arrangement set forth in claim 7 wherein said causing means further comprises means for maintaining a connection of the calling telephone station with said first relay means so that a receiver off-hook signal subsequently appearing on the called telephone station line will operate said first relay means to re-establish the interrupted connection between the called and calling telephone station lines.

9. A telephone station make-busy arrangement for use with a telephone office trunk arranged to selectively establish a transmission connection of a calling telephone station line with a called telephone station line comprising generating means for generating ringing and busy tone signals, first relay means for returning an answer signal to the calling telephone station line, second relay means for connecting said first relay means and said generating means to the called telephone station line, third relay means for establishing an operate path to operate said second relay means to apply ringing signals to the called telephone station line, conducting means for defining a low impedance path during presence of the ringing signals to release said second relay means and connect said first relay means with the called telephone station line and a high impedance path in absence of the ringing signals to inhibit operation of said connected first relay means, switch means for enabling a subscriber to selectively connect said conducting means across the called telephone station line, and means enabled by release of said second and third relay means in combination with release of said first relay means for opening the established transmission connection with the called telephone station line and for connecting said generating means to the calling telephone station line to return busy tone signals thereto.

10. A telephone station make-busy arrangement for use with a telephone office trunk arranged to selectively establish a connection of a calling telephone station line with a called telephone station line comprising station means actuated by ringing signals applied by the trunk to the called telephone station line for conditioning the called telephone station line to assume a low impedance state during occurrence of the ringing signals, and trunk means responsive to the low impedance state momentarily appearing on the called telephone station line for releasing the called telephone station line from the established connection and coupling busy tone signals to the calling telephone station line.

* * * * *